United States Patent
Liu et al.

(10) Patent No.: US 11,276,958 B2
(45) Date of Patent: Mar. 15, 2022

(54) CONNECTOR

(71) Applicant: Molex, LLC, Lisle, IL (US)

(72) Inventors: Hui Liu, Wuhan (CN); Xian-Xin Zhu, Wuhan (CN)

(73) Assignee: Molex, LLC, Lisle, IL (US)

( * ) Notice: Subject to any disclaimer, the term of this patent is extended or adjusted under 35 U.S.C. 154(b) by 30 days.

(21) Appl. No.: 16/823,353

(22) Filed: Mar. 19, 2020

(65) Prior Publication Data

US 2020/0313348 A1    Oct. 1, 2020

(30) Foreign Application Priority Data

Mar. 25, 2019  (CN) .......................... 201910227144.3

(51) Int. Cl.
*H01R 13/627*  (2006.01)
*H01R 13/639*  (2006.01)

(52) U.S. Cl.
CPC ....... *H01R 13/6272* (2013.01); *H01R 13/639* (2013.01)

(58) Field of Classification Search
CPC .......................... H01R 13/6272; H01R 13/639
USPC ....................................................... 439/352
See application file for complete search history.

(56) References Cited

U.S. PATENT DOCUMENTS

| | | | | |
|---|---|---|---|---|
| 2,443,509 A | * | 6/1948 | Lundy | H01R 24/20 439/738 |
| 2,853,690 A | * | 9/1958 | Madison | H01R 13/627 439/155 |
| 3,680,033 A | * | 7/1972 | Kawai | H01R 13/627 439/352 |
| 4,211,461 A | * | 7/1980 | Wescott | H01R 13/6271 285/362 |

(Continued)

FOREIGN PATENT DOCUMENTS

| CN | 102349200 A | 2/2012 |
|---|---|---|
| CN | 103718392 A | 4/2014 |

(Continued)

OTHER PUBLICATIONS

Office Action received for CN Application No. 201910227144.3, dated Jun. 3, 2021, 12 Pages (06 Pages of English Translation and 06 Pages of Official notification).

*Primary Examiner* — Neil Abrams

(57) ABSTRACT

A connector includes a casing, a locking member and a sliding actuation frame. The casing has a housing, the housing has a mounting portion. The locking member is pivoted to the mounting portion and can rotate under a force, and has a front section and a rear section at opposite ends. The sliding actuation frame is provided in the mounting portion and can move between a normal position and an operated position relative to the housing, and includes an unlocking bar and a locking bar. When the sliding actuation frame is in the normal position, the locking bar abuts against (Continued)

the front section and the unlocking bar leaves the rear section to position the front section in the locking position and the front section cannot move toward the unlocking position. When the sliding actuation frame is operatively moved rearwardly from the normal position to the operated position along the front-rear direction, the locking bar leaves the front section and the unlocking bar abuts against the rear section so as to make the front section move to the unlocking position.

14 Claims, 14 Drawing Sheets

(56) References Cited

U.S. PATENT DOCUMENTS

| | | | | |
|---|---|---|---|---|
| 5,330,366 | A * | 7/1994 | Tsuji | H01R 13/6271 439/352 |
| 5,564,939 | A * | 10/1996 | Maitani | H01R 13/6335 439/352 |
| 5,580,268 | A * | 12/1996 | Miyazawa | H01R 13/639 439/352 |
| 5,911,424 | A * | 6/1999 | Rovinsky | B62B 5/06 280/79.11 |
| 6,250,942 | B1 * | 6/2001 | Lemke | H01R 13/6272 439/352 |
| 6,267,612 | B1 * | 7/2001 | Arcykiewicz | H01R 13/6275 439/253 |
| 6,439,918 | B1 * | 8/2002 | Togami | G02B 6/4246 439/372 |
| 6,494,623 | B1 * | 12/2002 | Ahrens | G02B 6/4292 385/76 |
| 6,786,754 | B2 * | 9/2004 | Yamaoka | H01R 13/635 439/153 |
| 6,851,867 | B2 * | 2/2005 | Pang | G02B 6/4261 385/88 |
| 7,040,911 | B1 * | 5/2006 | Ho | G02B 6/4292 439/352 |
| 7,090,523 | B2 * | 8/2006 | Shirk | G02B 6/4246 439/352 |
| 7,108,523 | B2 * | 9/2006 | Hartman | H01R 13/6582 439/157 |
| 7,156,683 | B2 * | 1/2007 | Gupta | H01R 13/629 439/352 |
| 7,175,464 | B2 * | 2/2007 | Ferderer | H01R 13/6272 439/352 |
| 7,201,608 | B2 * | 4/2007 | Rosenberger | H01R 13/6277 439/352 |
| 7,261,475 | B2 * | 8/2007 | Sasaki | G02B 6/4246 385/88 |
| 7,297,013 | B2 * | 11/2007 | Caveney | H01R 13/6272 439/352 |
| 7,322,845 | B2 * | 1/2008 | Regnier | H01R 13/6275 439/352 |
| 7,325,975 | B2 * | 2/2008 | Yamada | G02B 6/4261 385/54 |
| 7,374,347 | B1 * | 5/2008 | Oki | G02B 6/4201 385/88 |
| 7,473,124 | B1 * | 1/2009 | Briant | H01R 13/6275 439/352 |
| 7,484,988 | B2 * | 2/2009 | Ma | H01R 13/502 439/350 |
| 7,507,111 | B2 * | 3/2009 | Togami | G02B 6/4246 385/88 |
| 7,648,289 | B2 * | 1/2010 | Miyoshi | G02B 6/4292 385/92 |
| 7,785,129 | B2 * | 8/2010 | Chen | H01R 13/5219 439/352 |
| 7,892,004 | B2 * | 2/2011 | Hertzler | H01R 13/6277 439/312 |
| 7,914,347 | B2 * | 3/2011 | Paulus | H01R 24/50 439/680 |
| 8,040,687 | B2 * | 10/2011 | Pirillis | H05K 7/1412 361/801 |
| 8,506,172 | B2 * | 8/2013 | Meadowcroft | G02B 6/4261 385/53 |
| 8,562,373 | B2 * | 10/2013 | Wu | H01R 13/6658 439/352 |
| 8,690,591 | B2 * | 4/2014 | Charnesky | H01R 13/6397 439/153 |
| 9,001,515 | B2 * | 4/2015 | Tang | H01R 13/6335 361/747 |
| 9,118,149 | B2 * | 8/2015 | Kappla | H01R 13/6275 |
| 9,219,333 | B2 * | 12/2015 | Wang | G02B 6/3897 |
| 9,601,868 | B2 * | 3/2017 | Barrefelt | H01R 13/6275 |
| 9,841,568 | B2 * | 12/2017 | Wang | G02B 6/4292 |
| 9,893,465 | B2 * | 2/2018 | Jimenez, III | H01R 12/721 |
| 10,224,673 | B2 * | 3/2019 | Sun | H01R 13/639 |
| 10,288,824 | B2 * | 5/2019 | Lin | G02B 6/4246 |
| 10,795,101 | B2 * | 10/2020 | Dong | H01R 13/6275 |
| 10,978,830 | B2 * | 4/2021 | Hammerling | H01R 13/639 |
| 2006/0078259 | A1 * | 4/2006 | Fuchs | G02B 6/4201 385/88 |
| 2007/0042630 | A1 * | 2/2007 | Huning | H01R 13/6273 439/350 |
| 2012/0088392 | A1 | 4/2012 | Wagner | |
| 2018/0254581 | A1 | 9/2018 | Yeh et al. | |
| 2020/0313348 | A1 * | 10/2020 | Liu | H01R 13/639 |

FOREIGN PATENT DOCUMENTS

| | | |
|---|---|---|
| CN | 103918137 B | 10/2016 |
| CN | 107834302 A | 3/2018 |
| JP | H07168919 A | 7/1995 |
| TW | 201013056 A | 4/2010 |
| WO | 2017195092 A1 | 11/2017 |

* cited by examiner

CONNECTOR

RELATED APPLICATION

This application claims priority to Chinese Application No. 201910227144.3, filed on Mar. 25, 2019, which is incorporated by reference in its entirety.

TECHNICAL FIELD

The present disclosure relates to a connector, particularly relates to a pluggable connector.

BACKGROUND ART

SFP (Small Form-factor Pluggable) connector is widely used in the field of optical-electrical communication, and is used to mate with a receptacle of an electronic device for example a switch, a router and the like. The existing SFP connector usually has a locking mechanism, when mating of the SFP connector and the receptacle is completed, the locking mechanism can fix the SFP connector in the receptacle, and when the SFP connector is to be pulled out of the receptacle, the locking mechanism can be released by, for example, pulling a pull bar at a rear end of the SFP connector, and the SFP connector can be pulled out at the same time. Chinese patent application issuance publication No. CN103918137B (hereinafter referred to as a first former case) discloses a connector element having a sinking type locking mechanism. Referring to FIG. 4 of the first former case, a mounting portion of the connector forms a transverse strut, the transverse strut is used to actuate a rocker, the rocker has a catch element for fixing the connector to a receptacle, when a pull tab of the connector is operatively moved toward an upper left corner of FIG. 4 in the first former case, the pull tab will bring the transverse strut to actuate the rocker, so that the rocker rotates in a clockwise direction to sink the catch element, thereby achieving the effect of unlocking. However, a lower side of an end of the rocker connected to the catch element is only supported by a spring, if the connector is affected by an external force or the catch element is accidentally touched by an external force, it will easily cause the catch element to sink and lose the technical effect of locking.

SUMMARY

Therefore, one of objects of the present disclosure is to provide a connector which can prevent a front section of a locking member from being moved from a locking position to an unlocking position due to accidental touch of the locking member in a mating state.

Therefore, in some embodiments, a connector of the present disclosure comprises a casing, a locking member and a sliding actuation frame. The casing comprises a housing, the housing has a mounting portion. The locking member is pivoted to the mounting portion and can rotate, and has a front section positioned in front of a pivot junction and a rear section positioned behind the pivot junction in a front-rear direction, and the front section is capable of pivoting between a locking position and an unlocking position. The sliding actuation frame is provided in the mounting portion and can move between a normal position and an operated position relative to the housing, and comprises an unlocking bar correspondingly cooperating with the rear section and a locking bar correspondingly cooperating with the front section. When the sliding actuation frame is in the normal position, the unlocking bar leaves the rear section, the locking bar abuts against the front section to position the front section in the locking position and prevent the front section from moving toward the unlocking position. When the sliding actuation frame is operatively moved rearwardly from the normal position to the operated position along the front-rear direction, the locking bar leaves the front section and the unlocking bar abuts against the rear section to make the front section move to the unlocking position.

In some embodiments, the mounting portion is positioned on an upper surface of the housing, the unlocking bar is positioned below the rear section, the locking bar is positioned below the front section, the locking member can be pushed by the unlocking bar to make the front section rotate downwardly to the unlocking position or the locking member can be pushed by the locking bar to make the front section rotate upwardly to the locking position, the connector further comprises at least one elastic member provided in the mounting portion and connected to the sliding actuation frame, the elastic member is used to provide an elastic recovering force for returning the sliding actuation frame to the normal position.

In some embodiments, the rear section has a first pushed surface which used to be pushed by the unlocking bar to sink the front section to the unlocking position, the locking bar has an upper stopping surface facing upwardly, the front section has a second pushed surface which is used to be pushed by the locking bar to make the front section lifted to the locking position and a lower stopping surface which is connected to the second pushed surface and extends forwardly and faces downwardly, when the sliding actuation frame is positioned in the normal position, the upper stopping surface of the locking bar abuts against the lower stopping surface of the front section.

In some embodiments, the first pushed surface is inclined rearwardly and downwardly, the second pushed surface is inclined forwardly and downwardly.

In some embodiments, the unlocking bar has a first arc surface for pushing the first pushed surface, the locking bar further has a second arc surface for pushing the second pushed surface.

In some embodiments, the mounting portion has a recessed groove recessed inwardly from the upper surface and a pivot seat provided in a center of the recessed groove, the locking bar and the unlocking bar are positioned in the recessed groove respectively in front of and behind the pivot seat, the pivot seat is used to pivot the locking member.

In some embodiments, the sliding actuation frame comprises an upper frame wall and two side frame walls, the upper frame wall has a front frame bar and a rear frame bar which are spaced apart from each other in the front-rear direction, the front frame bar is configured with the locking bar, the rear frame bar is configured with the unlocking bar, the locking bar and the unlocking bar are positioned in the recessed groove, the side frame walls sandwich the housing therebetween.

In some embodiments, the connector comprises two elastic members provided in the recessed groove, and two ends of each elastic member respectively abut against the front frame bar and the recessed groove.

In some embodiments, the connector further comprises a cover covering the sliding actuation frame and engaged with the pivot seat, so that the upper frame wall of the sliding actuation frame is limited between the cover and the housing.

In some embodiments, the casing further comprises a stopping plate which is connected to a peripheral side of the pivot seat and used for the sliding actuation frame to abut against so as to limit the sliding actuation frame in the normal position when the sliding actuation frame returns to the normal position by the elastic members.

In some embodiments, the front section has a locking block portion (223) facing upwardly.

In some embodiments, the connector further comprises a first pull ring connected to the sliding actuation frame.

In some embodiments, the connector further comprises a second pull ring connected to the sliding actuation frame in a manner of capable of rotating.

In some embodiments, the recessed groove has a ring groove portion encircling the pivot seat and an extending groove portion formed from a rear side of the ring groove portion, two shoulder portions are correspondingly formed on two sides of a joint between the extending groove portion and the ring groove portion, two ends of each elastic member respectively abut against the front frame bar and the corresponding shoulder portion, when the sliding actuation frame is in the normal position, the unlocking bar is positioned at the ring groove portion behind the pivot seat, while when the sliding actuation frame is translated to the operated position, the unlocking bar is positioned in the extending groove portion.

In some embodiments, the recessed groove further has a receiving groove portion connected to a front side of the ring groove portion, the front section of the locking member is provided in the receiving groove portion and can move up and down.

The present disclosure at least has the following technical effects: when the front section of the locking member is in the locking position, the locking bar of the sliding actuation frame constantly abuts against the front section, so that the locking member can be supported by the locking bar and kept in a fixed position even if the locking member is accidentally touched by an external force.

BRIEF DESCRIPTION OF THE DRAWINGS

Other features and technical effects of the present disclosure will be apparent in the embodiments referring to the accompanying figures, in which.

DETAILED DESCRIPTION OF THE PREFERRED EMBODIMENTS

Figure 1:
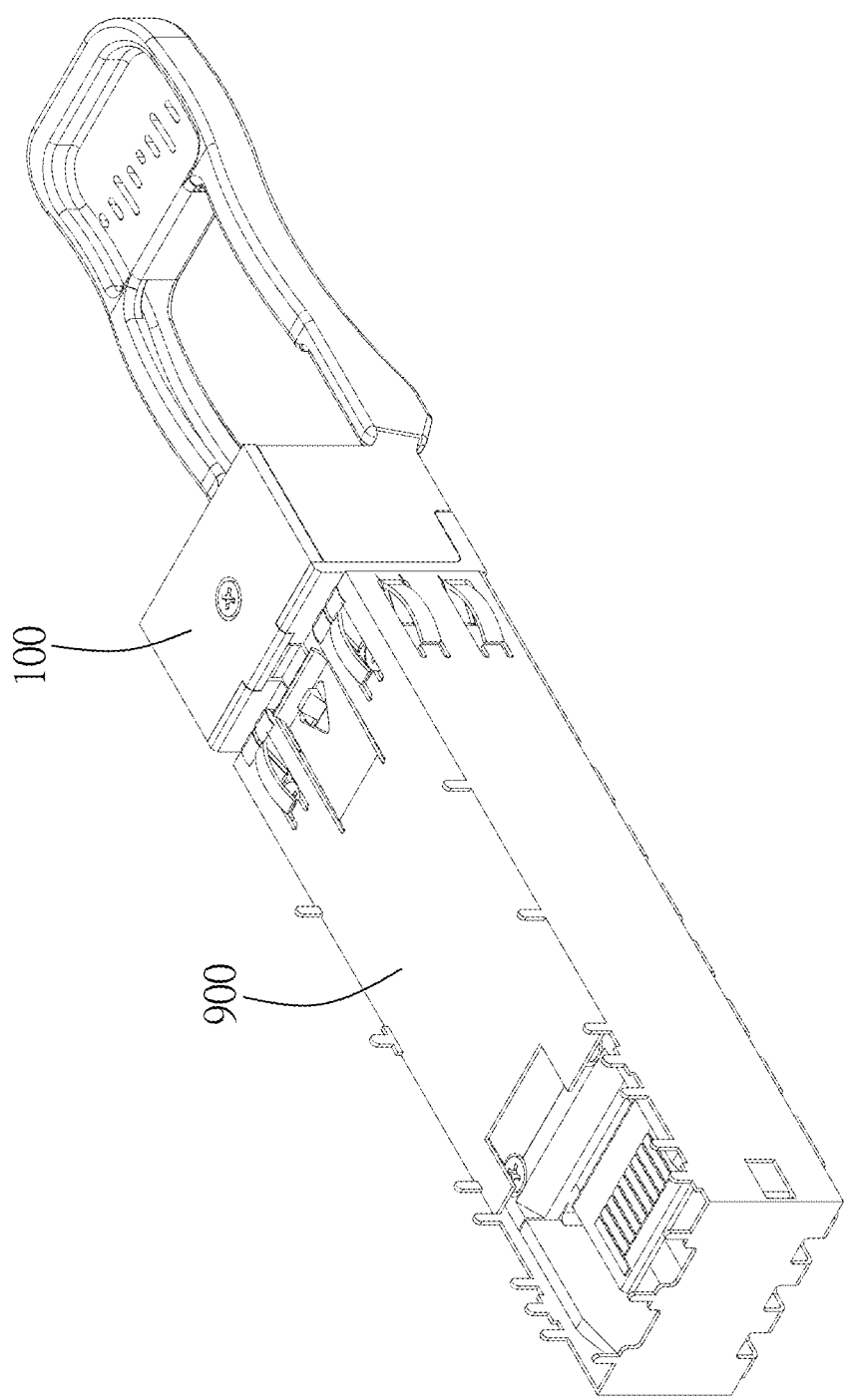
FIG. 1 is a perspective view of a first embodiment of a connector of the present disclosure mated with a mating connector.

Before the present disclosure is described in detail, it should be noted that like elements are denoted by the same reference numerals in the following description.

Figure 2:
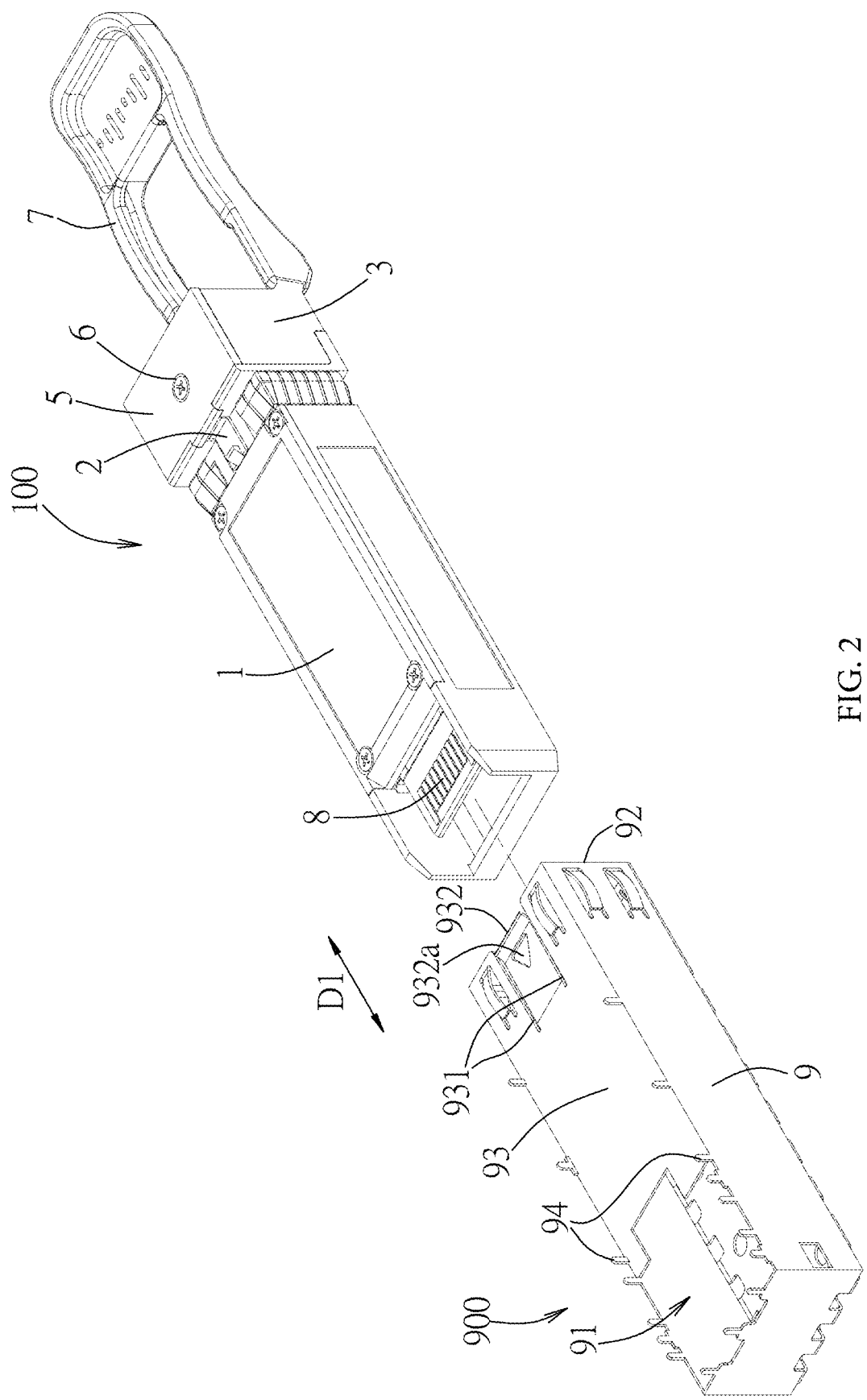
FIG. 2 is a perspective view of the first embodiment separated from the mating connector.

Referring to FIG. 1 and FIG. 2, a connector 100 of the present disclosure is, for example, a SFP (Small Form-factor Pluggable) connector, and is adapted to mate with a mating connector 900. The mating connector 900 in the embodiment is described as a board-end connector for an example, and is adapted to be provided on an electronic device (not shown) with data exchange function, such as a data machine, a router or a computer host, and exposed to a mating port defined by an outer case of the electronic device. The mating connector 900 includes a cage 9 and a receptacle connector (not shown) which is provided on a circuit board (not shown) and positioned in the cage 9. The cage 9 defines an accommodating space 91 and a port 92 communicated with the accommodating space 91. The cage 9 has a base wall 93 positioned on a side of the accommodating space 91 and a plurality of legs 94 from left and right sides of the base wall 93. The base wall 93 forwardly forms two slits 931 from a side of the base wall 93 adjacent to the port 92 to form a spring plate portion 932 with a free end thereof adjacent to the port 92. The spring plate portion 932 has a latching hole 932a. The cage 9 can be mounted to the circuit board through the plurality of legs 94 in a direction that the base wall 93 faces a board surface of the circuit board.

Figure 3:
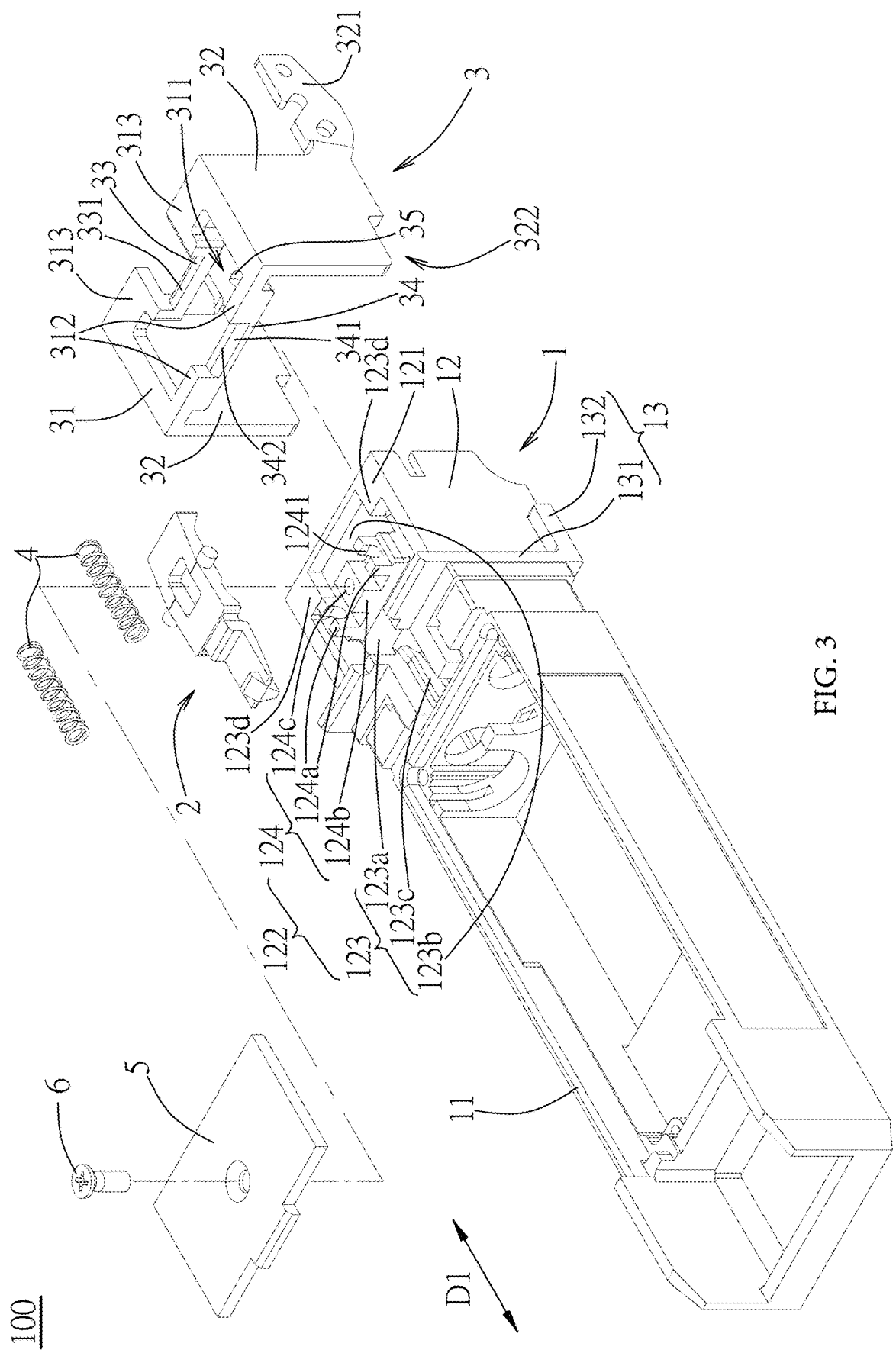
FIG. 3 is an exploded perspective view of the first embodiment, in which a first pull ring of the first embodiment is not shown.
Figure 4:
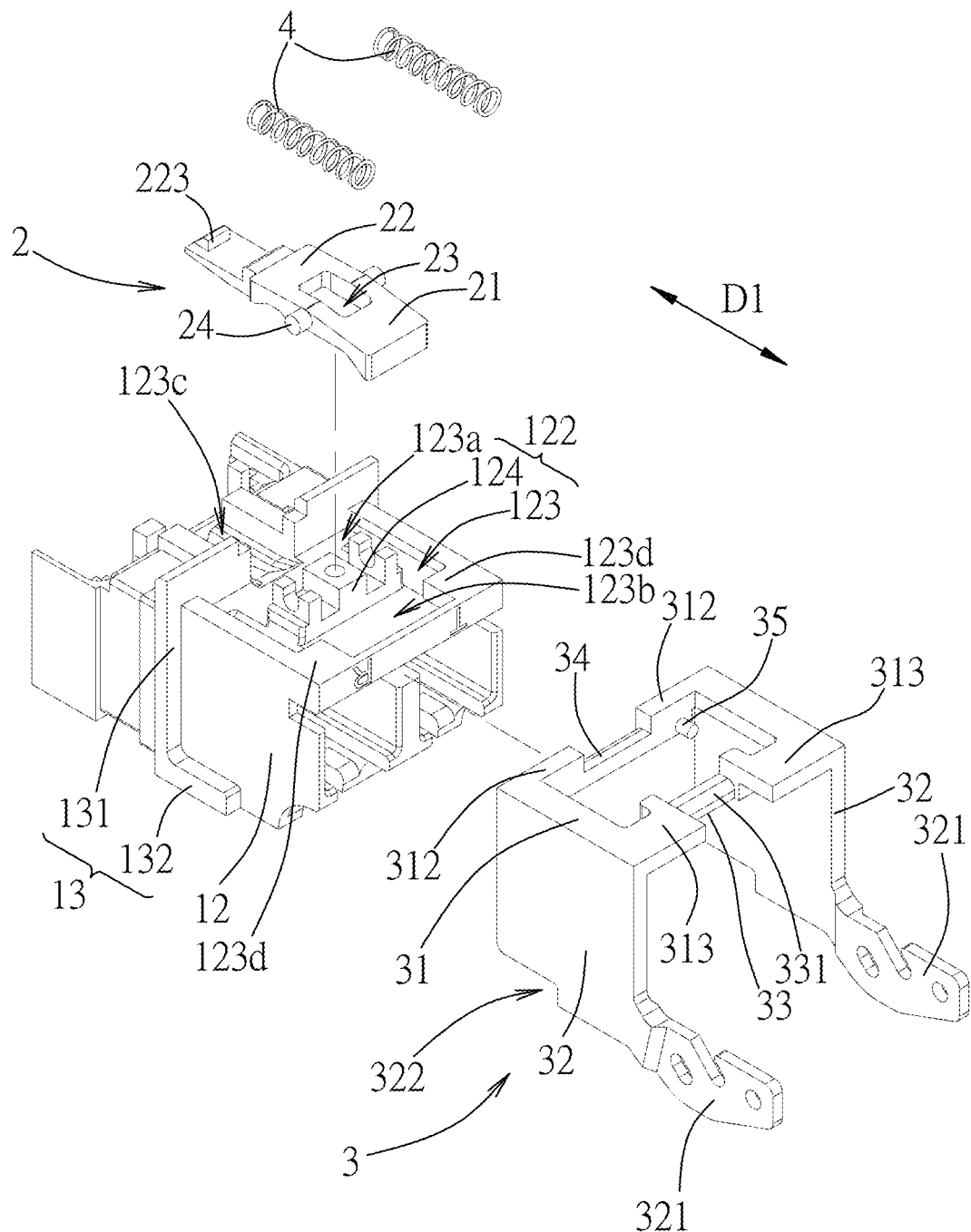
FIG. 4 is a partial view of FIG. 3 from another angle.
Figure 5:
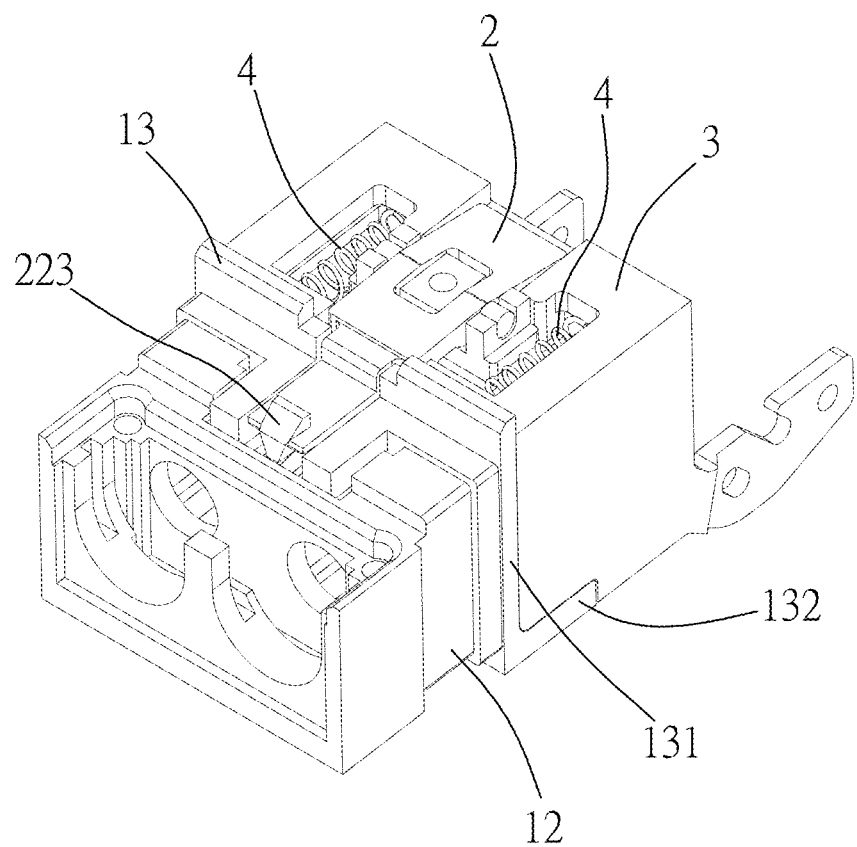
FIG. 5 is a partial perspective view of the first embodiment, illustrating a sliding actuation frame of the first embodiment in a normal position.
Figure 6:
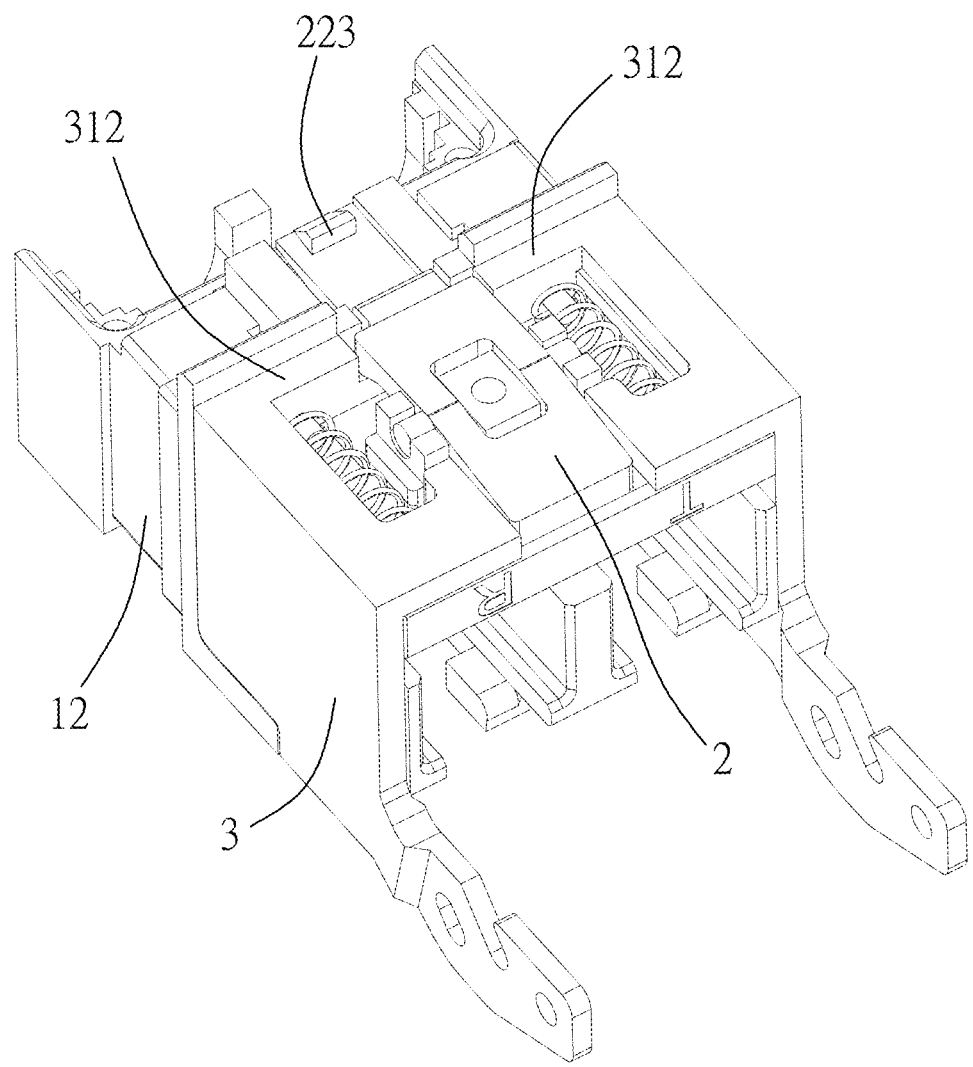
FIG. 6 is a view of FIG. 5 from another angle.
Figure 7:
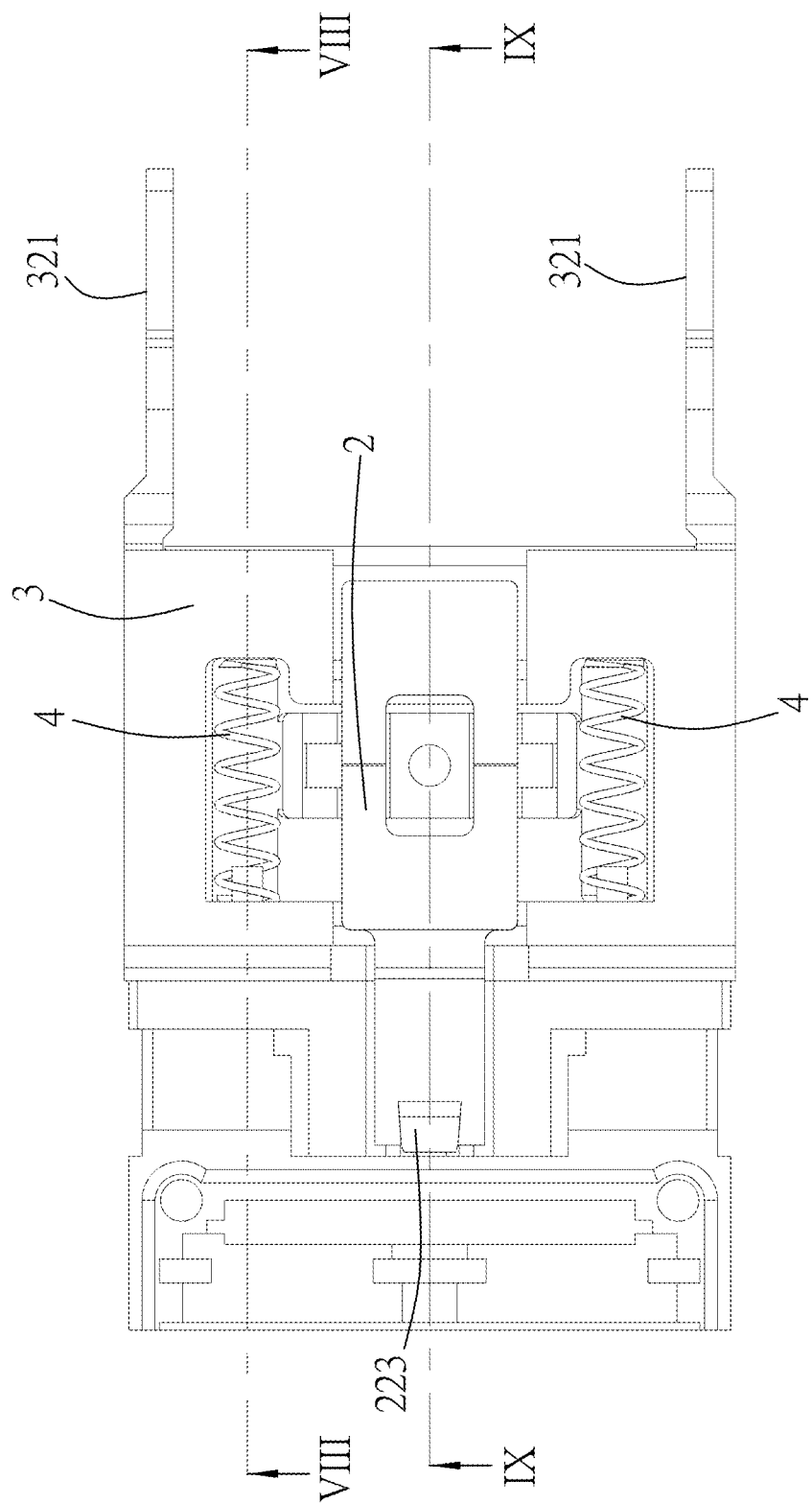
FIG. 7 is a top view of FIG. 5.

Referring to FIG. 2 to FIG. 4, a first embodiment of the connector 100 of the present disclosure includes a casing 1, a locking member 2, a sliding actuation frame 3, two elastic members 4, a cover 5, a fastener 6 and a first pull ring 7.

The casing 1 has a mating portion 11, a housing 12 and a stopping plate 13. The mating portion 11 is adapted to be inserted into the accommodating space 91 forwardly via the port 92 of the cage 9 in a front-rear direction D1 and is electrically connected with the mating connector 900 via a paddle card 8 provided at a front end of the mating portion 11. The housing 12 is connected to a rear end of the mating portion 11. The stopping plate 13 is connected between the mating portion 11 and the housing 12.

The housing 12 has a substantially square block shape, and has an upper surface 121 and a mounting portion 122 positioned on the upper surface 121 in an orientation as shown in the drawings. In the embodiment, the mounting portion 122 has a recessed groove 123 recessed inwardly from the upper surface 121 and a pivot seat 124 provided in a center of the recessed groove 123. The recessed groove 123 has a ring groove portion 123a encircling a periphery of the pivot seat 124, an extending groove portion 123b formed rearwardly from a rear side of the ring groove portion 123a and a receiving groove portion 123c connected to a front side of the ring groove portion 123a and inclined forwardly and recessed inwardly, the receiving groove portion 123c extends beyond the stopping plate 13 to the mating portion 11. Two shoulder portions 123d are formed on two sides of a joint between the extending groove portion 123b and the ring groove portion 123a. The pivot seat 124 has two bearing portions 124a and a positioning portion 124b positioned between the bearing portions 124a. Each bearing portion 124a forms a notch 1241 facing upwardly. The positioning portion 124b has a locking hole 124c facing upwardly.

The stopping plate 13 is connected to a peripheral side of the housing 12 corresponding to a junction of the ring groove portion 123a and the receiving groove portion 123c, and has a stopping portion 131 which has a height exceeding the upper surface 121 and a width exceeding two sides of the housing 12 and two bottom rail portions 132 which are connected to a bottom edge of the stopping portion 131, respectively attached to the two sides of the housing 12 and extends rearwardly.

Figure 9:
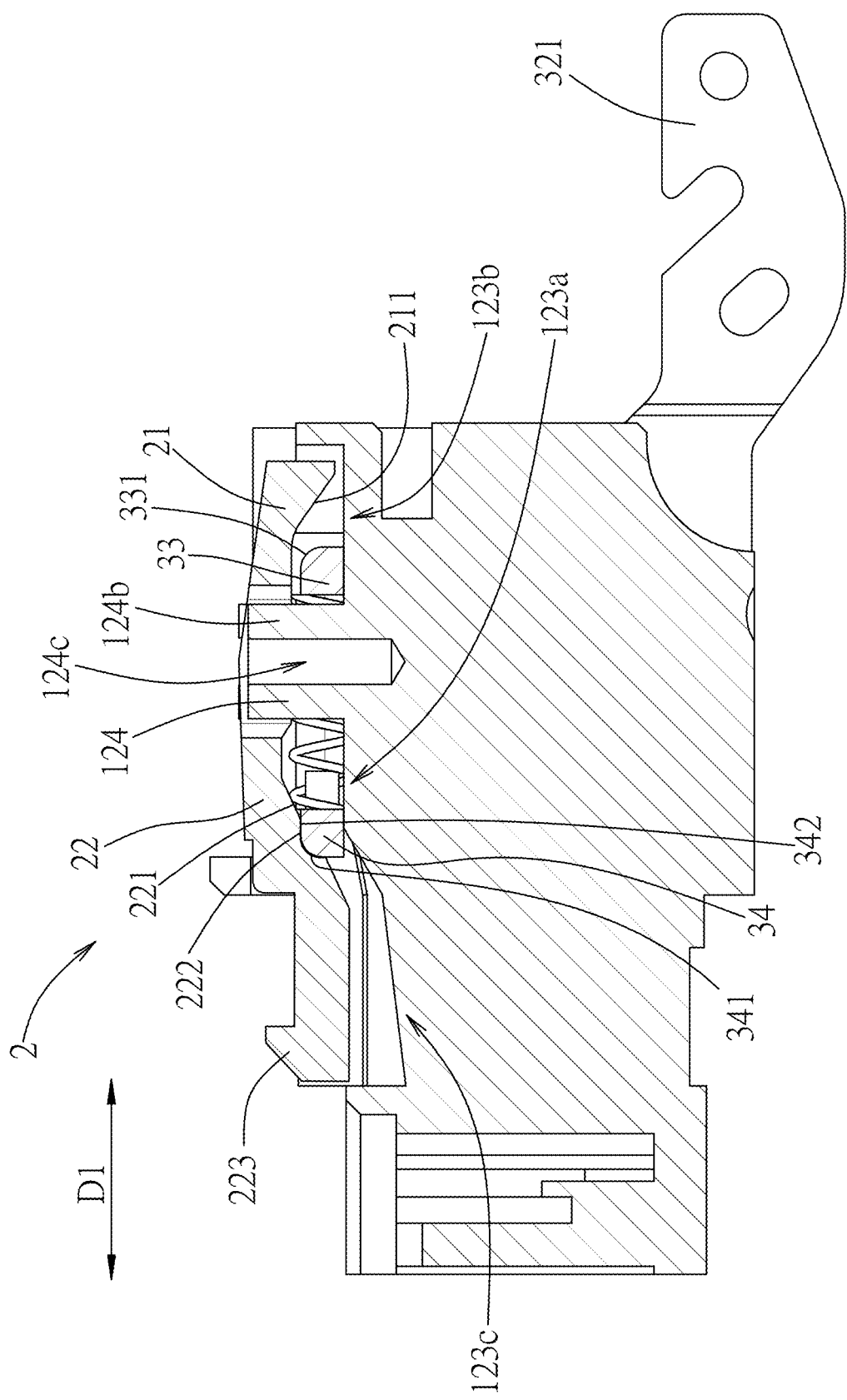
FIG. 9 is a cross-sectional view taken along a line IX-IX of FIG. 7, illustrating that when the sliding actuation frame is in the normal position, a front section of a locking member of the first embodiment is correspondingly positioned in a locking position.
Figure 13:
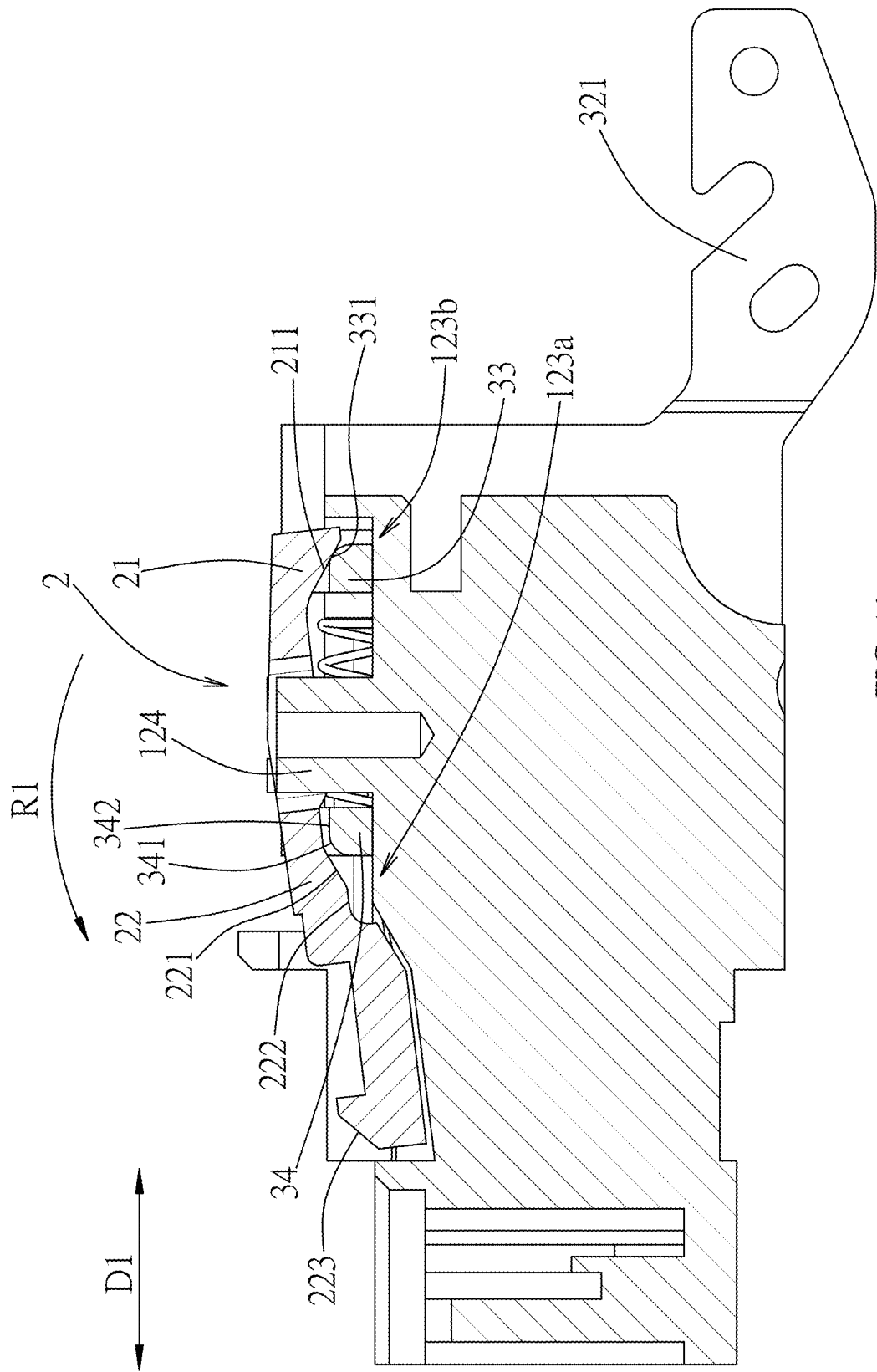
FIG. 13 is a cross-sectional view taken along a line XIII-XIII of FIG. 11, illustrating that the locking member leaves the front section, and an unlocking bar of the sliding actuation frame simultaneously pushes a rear section of the locking member, so that the front section sinks to an unlocking position.

Referring to FIG. 4, FIG. 9 and FIG. 13, the locking member 2 is pivoted to the pivot seat 124 of the mounting portion 122 and can rotate under a force, and includes a rear section 21, a front section 22, a positioning hole 23 and two pivoting shafts 24. The rear section 21 and the front section 22 are defined by using a pivot junction between the pivoting shafts 24 and the mounting portion 122 as a boundary. The rear section 21 is positioned behind the pivot junction in the front-rear direction D1, and a bottom surface of the rear section 21 faces the recessed groove 123 and has a first pushed surface 211 inclined rearwardly and downwardly. The front section 22 is positioned in front of the pivot junction in the front-rear direction D1, and a bottom surface of the front section 22 faces the recessed groove 123 and has a second pushed surface 221 inclined forwardly and downwardly, a lower stopping surface 222 extending forwardly from the second pushed surface 221 and facing downwardly, and a locking block portion 223 positioned at a distal end of the front section 22 and facing upwardly. The positioning hole 23 is formed at a position between the rear section 21 and the front section 22, and sheathes the positioning portion 124b of the pivot seat 124. The pivoting shafts 24 respectively protrude outwardly from left and right sides and are pivoted to the pivot seat 124 respectively via the notches 1241 of the bearing portions 124a, so that the locking member 2 can perform a seesaw-like action on the pivot seat 124, and in turn drive the front section 22 to move up and down to enter and exit the receiving groove portion 123c.

Continuing to refer to FIG. 3 and FIG. 4, the sliding actuation frame 3 can be translationally provided to the mounting portion 122, and is used to push the locking member 2 to rotate. In the embodiment, the sliding actuation frame 3 includes an upper frame wall 31, two side frame walls 32 which are respectively connected to two opposite sides of the upper frame wall 31, an unlocking bar 33 provided on a rear side of the upper frame wall 31 and correspondingly cooperating with the rear section 21 of the locking member 2, and a locking bar 34 provided on a front side of the upper frame wall 31 and correspondingly cooperating with the front section 22 of the locking member 2. The upper frame wall 31 has a front frame bar 312 and a rear frame bar 313 which are connected to the side frame walls 32 and spaced apart by an opening 311 in the front-rear direction D1. A center of the front frame bar 312 is recessed downwardly to correspondingly accommodate the front section 22 of the locking member 2 and constitutes the locking bar 34, a center of the rear frame bar 313 is recessed downwardly to correspondingly accommodate the rear section 21 of the locking member 2 and constitutes the unlocking bar 33. The locking bar 34 is placed downwardly into the ring groove portion 123a in front of the pivot seat 124, the unlocking bar 33 is placed downwardly into the ring groove portion 123a behind the pivot seat 124. The side frame walls 32 sandwich the two sides of the housing 12 therebetween, each side frame wall 32 has a connecting piece portion 321 at a rear side thereof and a notch 322 positioned on a bottom edge at a front side thereof and capable of engaging with the bottom rail portion 132. The unlocking bar 33 is positioned below the rear section 21 of the locking member 2, and has a first arc surface 331 facing rearwardly. The locking bar 34 is positioned below the front section 22 of the locking member 2, and has a second arc surface 341 facing forwardly and an upper stopping surface 342 positioned behind the second arc surface 341 and facing upwardly. Two positioning posts 35 are provided on an inner side of the front frame bar 312 and respectively face rearwardly to correspond to the two shoulder portions 123d in the front-rear direction D1.

Continuing to refer to FIG. 3 and FIG. 4, the elastic members 4 are provided in the ring groove portion 123a on left and right sides of the pivot seat 124, a front end of each elastic member 4 respectively sheathes the positioning post 35 and abuts against the front frame bar 312, a rear end of each elastic member 4 abuts against the corresponding shoulder portion 123d. The cover 5 covers the sliding actuation frame 3 and is fixed by screwing the fastener 6 into the locking hole 124c of the pivot seat 124, so that the cover 5 and the housing 12 together can limit the sliding actuation frame 3 in the up-down direction. The first pull ring 7 is connected to the connecting piece portions 321 of the side frame walls 32 to operate the sliding actuation frame 3 to move rearwardly in the front-rear direction D1. In a variant embodiment, the recessed groove 123 may not include the extending groove portion 123b and the shoulder portions 123d, that is, the recessed groove 123 extends rearwardly, and the rear end of the elastic member 4 abuts against a rear wall of the recessed groove 123.

Figure 10:
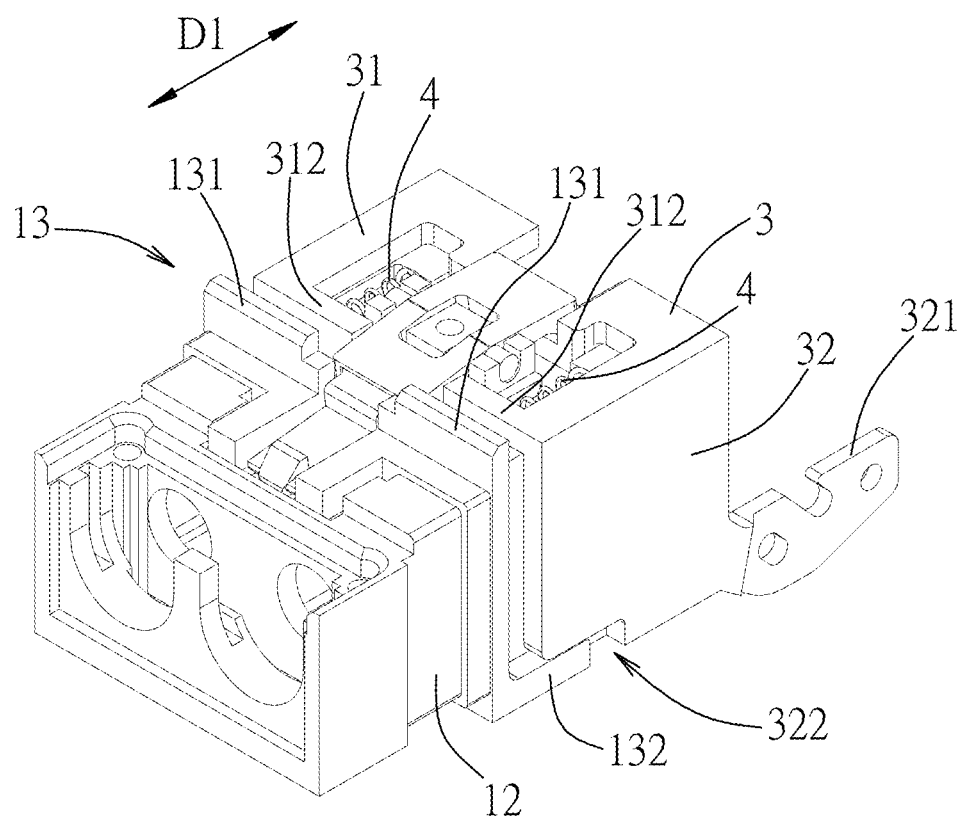
FIG. 10 is a partial perspective view of the first embodiment, illustrating that the sliding actuation frame is moved toward a pulling direction to an operated position.
Figure 11:
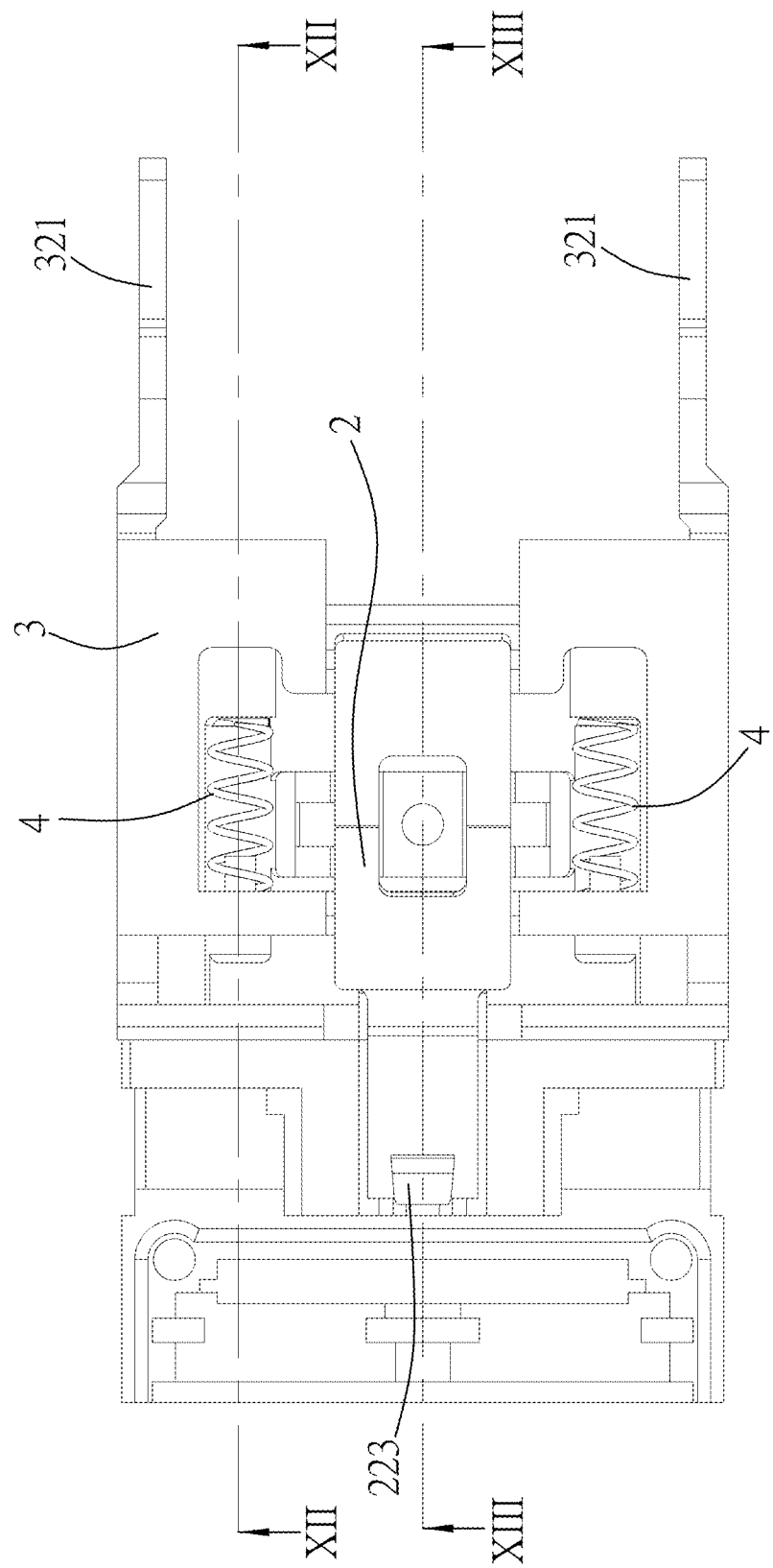
FIG. 11 is a top view of FIG. 10.
Figure 12:
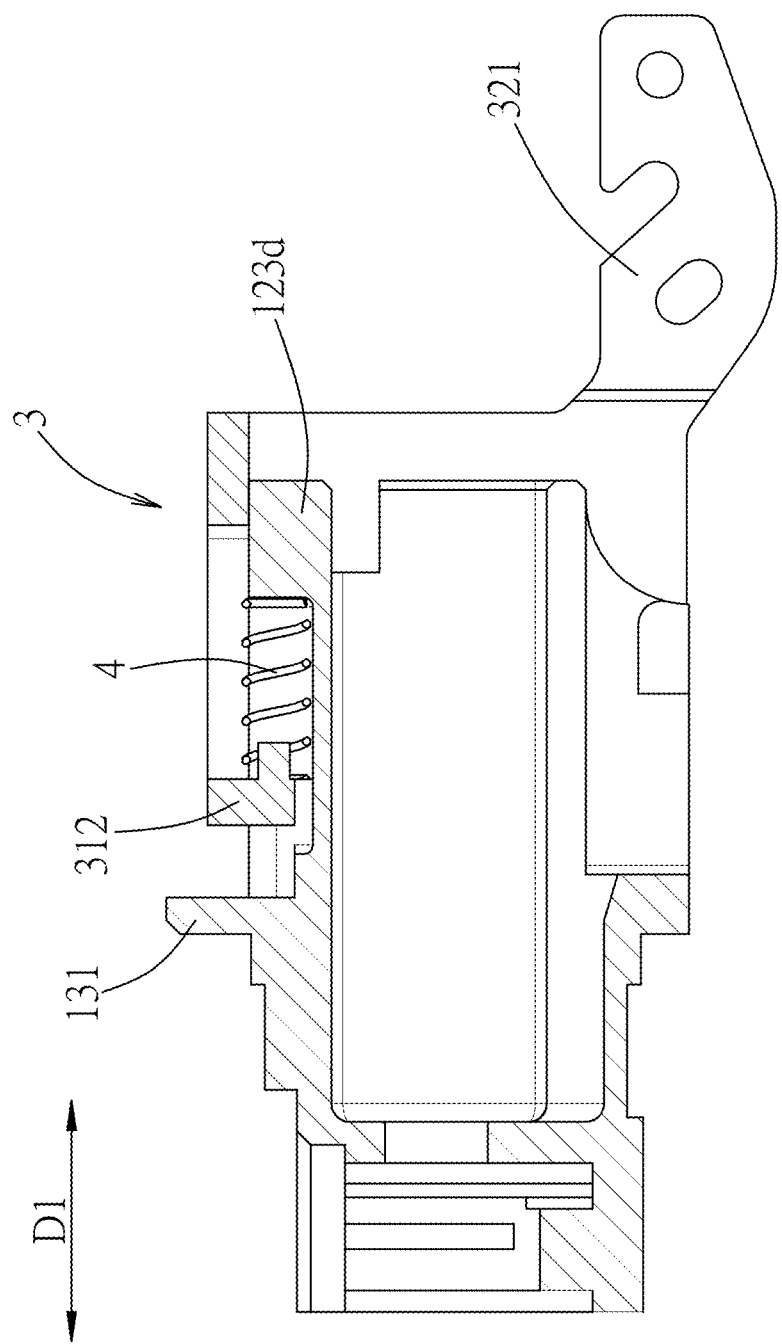
FIG. 12 is a cross-sectional view taken along a line XII-XII of FIG. 11, illustrating that the elastic members are compressed by being pushed by the sliding actuation frame.

The sliding actuation frame 3 can be moved relative to the housing 12 between a normal position as shown in FIG. 5 to FIG. 9 and an operated position as shown in FIG. 10 to FIG. 0.13, and make the locking member 2 to be correspondingly pushed by the sliding actuation frame 3, so that the front section 22 of the locking member 2 can pivot between a locking position as shown in FIG. 9 and an unlocking position as shown in FIG. 13. The detailed operation manner will be described in detail in the following paragraphs.

First referring to FIG. 5 to FIG. 9, when the sliding actuation frame 3 is in the normal position, the front frame bar 312 of the sliding actuation frame 3 is pushed forwardly by the elastic members 4, so that a front side of the upper frame wall 31 and front sides of the side frame walls 32 respectively abut against the stopping portion 131 of the stopping plate 13, and the notches 322 of the side frame walls 32 of the sliding actuation frame 3 firmly abut against the bottom rail portions 132. The unlocking bar 33 is closed to the pivot seat 124 and is not in contact with the rear section 21 of the locking member 2, the first arc surface 331 of the unlocking bar 33 leaves the first pushed surface 211 of the rear section 21 forwardly. The upper stopping surface 342 of the locking bar 34 abuts against the lower stopping surface 222 of the front section 22, so that the front section 22 moves upwardly out of the receiving groove portion 123c and is fixed at the locking position and is in a horizontal state in the embodiment. It should be particularly noted that, since the upper stopping surface 342 of the locking bar 34 constantly abuts against the lower stopping surface 222 of the front section 22 when the sliding actuation frame 3 is in the normal position, even if the locking block portion 223 is accidentally touched by an external force, the front section 22 of the locking member 2 can be kept in the locking position since the front section 22 of the locking member 2 is firmly supported by the locking bar 34, and thus cannot move toward the unlocking position. Furthermore, during the mating of the connector 100 with the mating connector 900 (see FIG. 2), the locking member 2 is kept in the locking position, and when the locking member 2 contacts a bottom surface of the spring plate portion 932, the locking block portion 223 of the locking member 2 will make the spring plate portion 932 flex outwardly until the locking block portion 223 of the locking member 2 slides into the corresponding latching hole 932a, the spring plate portion 932 elastically recovers downwardly to make the locking block portion 223 latch with the latching hole 932a, thereby completing the mating of the connector 100 and the mating connector 900.

Referring to FIG. 10 to FIG. 13, when the connector 100 is to be separate from the mating connector 900 (see FIG. 2), a pulling force can be applied to pull the first pull ring 7 (see FIG. 2) rearwardly, in turn drives the sliding actuation frame 3 to move horizontally and rearwardly and perform unlocking. During the movement of the sliding actuation frame 3, the front frame bar 312 presses the elastic members 4 rearwardly to make the elastic members 4 accumulate an elastic recovering force, the locking bar 34 leaves the front section 22 and move rearwardly to close to the pivot seat 124 and sequentially leaves the lower stopping surface 222 and the second pushed surface 221, and at the same time, the unlocking bar 33 moves away from the pivot seat 124 and moves rearwardly to the extending groove portion 123b, the first arc surface 331 of the unlocking bar 33 pushes the first pushed surface 211 of the rear section 21, so that the locking member 2 is forced to rotate counterclockwise along a pivot path R1 as shown in FIG. 13, thereby sinking the front section 22 to the unlocked position and making the sliding actuation frame 3 reach the operated position at the same time. When the front section 22 is in the unlocked position, the locking block portion 223 is separated from the latching hole 932a of the spring plate portion 932 of the mating connector 900 (see FIG. 2), so that relative fixed relationship between the connector 100 and the mating connector 900 is released, and the first pull ring 7 is pulled continuously to pull the connector 100 out of the mating connector 900.

Figure 8:
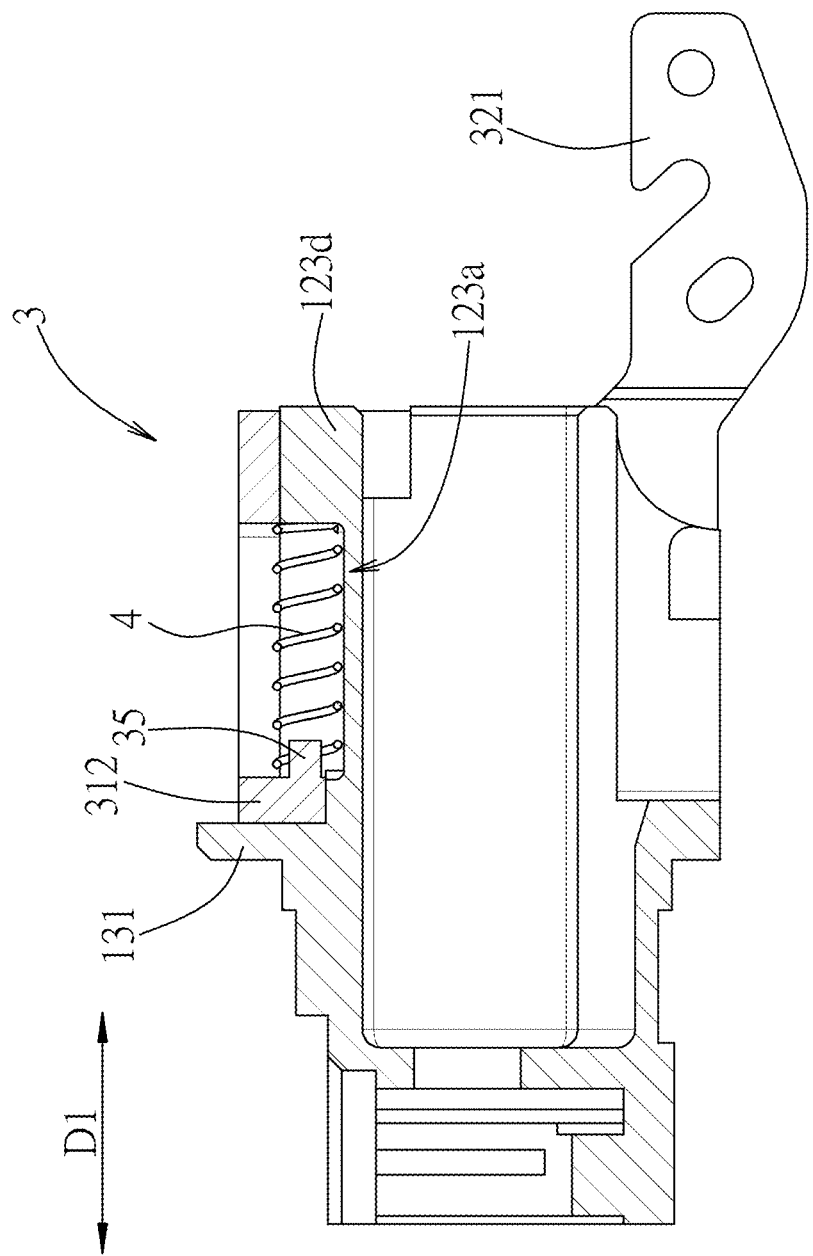
FIG. 8 is a cross-sectional view taken along a line VIII-VIII of FIG. 7, illustrating that two elastic members of the first embodiment push the sliding actuation frame to abut against a stopping plate of the first embodiment.

In combination with referring to FIG. 8 and FIG. 9, when the connector 100 is pulled out from the mating connector 900, and the pulling force applied to the first pull ring 7 is released, the elastic recovering force of the elastic members 4 will push the sliding actuation frame 3 to make the sliding actuation frame 3 to move forwardly relative to the housing 12 to abut against the stopping plate 13, the unlocking bar 33 leaves the first pushed surface 211 of the rear section 21 forwardly and leaves the extending groove portion 123b, the second arc surface 341 of the locking bar 34 pushes the second pushed surface 221 forwardly to make the front section 22 lifted to the locking position and continues to move until the second arc surface 341 of the locking bar 34 abuts against the lower stopping surface 222 of the front section 22 and the upper stopping surface 342 of the locking bar 34 abuts against the lower stopping surface 222 of the front section 22, so that the sliding actuation frame 3 returns to the normal position.

Figure 14:
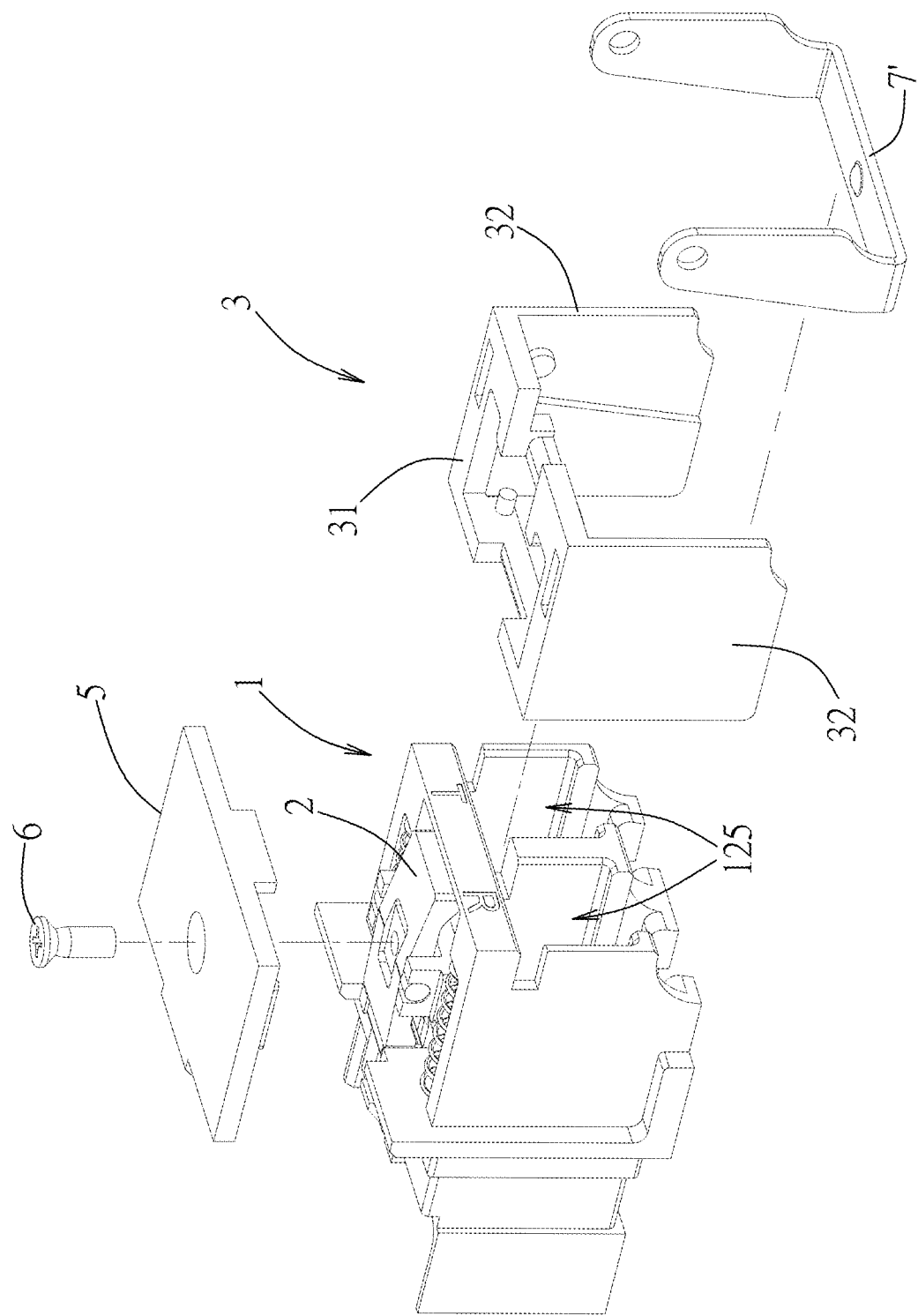
FIG. 14 is a partial exploded perspective view of a second embodiment of the connector of the present disclosure, illustrating that the second embodiment includes a second pull ring.

Referring to FIG. 14, a second embodiment of the connector 100 of the present disclosure is substantially the same as the first embodiment, a difference lies in that the side frame wall 32 of the sliding actuation frame 3 of the second embodiment does not have a connecting piece portion 321 (see FIG. 3) and the first pull ring 7 (see FIG. 2) is replaced by a second pull ring 7'. The second pull ring 7' is connected to inner side surfaces of the side frame walls 32 of the sliding actuation frame 3 in a manner of capable of rotating, the second pull ring 7' can be received in the receiving space 125 inside the housing 12 when the second pull ring 7' is not pulled.

In conclusion, when the front section 22 of the locking member 2 of the connector 100 of the present disclosure is in the locking position, the locking bar 34 of the sliding actuation frame 3 constantly abuts against the front section 22, so that the locking member 2 can be supported by the locking bar 34 to make that the front section 22 is positioned at the locking position and cannot move toward the unlocking position even if the locking member 2 is accidentally touched by an external force, so the object of the present disclosure can be indeed achieved.

However, the above description is only for the embodiments of the present disclosure, and it is not intended to limit the implementing scope of the present disclosure, and the simple equivalent changes and modifications made according to the claims and the contents of the specification are still included in the scope of the present disclosure.

The invention claimed is:
1. A connector, comprising:
 a casing comprising a housing, the housing having a mounting portion;
 a locking member which is pivoted to the mounting portion and can rotate, and has a front section positioned in front of a pivot junction and a rear section positioned behind the pivot junction in a front-rear direction, and the front section being capable of pivoting between a locking position and an unlocking position; and
 a sliding actuation frame which is provided in the mounting portion and can move between a normal position and an operated position relative to the housing, and comprises an unlocking bar correspondingly cooperating with the rear section and a locking bar correspondingly cooperating with the front section;
 when the sliding actuation frame is in the normal position, the unlocking bar leaving the rear section, the locking bar abutting against the front section to position the front section in the locking position and prevent the front section from moving toward the unlocking position;
 when the sliding actuation frame is operatively moved rearwardly from the normal position to the operated position along the front-rear direction, the locking bar leaving the front section and the unlocking bar abutting against the rear section to make the front section move to the unlocking position; and
 wherein the mounting portion is positioned on an upper surface of the housing, the unlocking bar is positioned below the rear section, the locking bar is positioned below the front section, the locking member can be pushed by the unlocking bar to make the front section rotate downwardly to the unlocking position or the locking member can be pushed by the locking bar to make the front section rotate upwardly to the locking position, the connector further comprises at least one elastic member provided in the mounting portion and connected to the sliding actuation frame, the elastic member is used to provide an elastic recovering force for returning the sliding actuation frame to the normal position.

2. The connector of claim 1, wherein the rear section has a first pushed surface which used to be pushed by the unlocking bar to sink the front section to the unlocking position, the locking bar has an upper stopping surface facing upwardly, the front section has a second pushed surface which is used to be pushed by the locking bar to make the front section lifted to the locking position and a lower stopping surface which is connected to the second pushed surface and extends forwardly and faces downwardly, when the sliding actuation frame is positioned in the normal position, the upper stopping surface of the locking bar abuts against the lower stopping surface of the front section.

3. The connector of claim 2, wherein the first pushed surface is inclined rearwardly and downwardly, the second pushed surface is inclined forwardly and downwardly.

4. The connector of claim 2, wherein the unlocking bar has a first arc surface for pushing the first pushed surface, the locking bar further has a second arc surface for pushing the second pushed surface.

5. The connector of claim 2, wherein the mounting portion has a recessed groove recessed inwardly from the upper surface and a pivot seat provided in a center of the recessed groove, the locking bar and the unlocking bar are positioned in the recessed groove respectively in front of and behind the pivot seat, the pivot seat is used to pivot the locking member.

6. The connector of claim 5, wherein the sliding actuation frame comprises an upper frame wall and two side frame walls, the upper frame wall has a front frame bar and a rear frame bar which are spaced apart from each other in the front-rear direction, the front frame bar is configured with the locking bar, the rear frame bar is configured with the unlocking bar, the locking bar and the unlocking bar are positioned in the recessed groove, the side frame walls sandwich the housing therebetween.

7. The connector of claim 6, wherein the connector comprises two elastic members provided in the recessed groove, and two ends of each elastic member respectively abut against the front frame bar and the recessed groove.

8. The connector of claim 6, wherein the connector further comprises a cover covering the sliding actuation frame and engaged with the pivot seat, so that the upper frame wall of the sliding actuation frame is limited between the cover and the housing.

9. The connector of claim 5, wherein the casing further comprises a stopping plate which is connected to a peripheral side of the pivot seat and used for the sliding actuation frame to abut against so as to limit the sliding actuation frame in the normal position when the sliding actuation frame returns to the normal position by the elastic member.

10. The connector of claim 1, wherein the front section has a locking block portion facing upwardly.

11. The connector of claim 1, further comprising a first pull ring connected to the sliding actuation frame.

12. The connector of claim 1, further comprising a second pull ring connected to the sliding actuation frame in a manner of capable of rotating.

13. The connector of claim 6, wherein the recessed groove has a ring groove portion encircling the pivot seat and an extending groove portion formed from a rear side of the ring groove portion, two shoulder portions are correspondingly formed on two sides of a joint between the extending groove portion and the ring groove portion, two ends of the elastic member respectively abut against the front frame bar and the corresponding shoulder portion, when the sliding actuation frame is in the normal position, the unlocking bar is positioned at the ring groove portion behind the pivot seat, while when the sliding actuation frame is translated to the operated position, the unlocking bar is positioned in the extending groove portion.

14. The connector of claim 13, wherein the recessed groove further has a receiving groove portion connected to a front side of the ring groove portion, the front section of the locking member is provided in the receiving groove portion and can move up and down.

* * * * *